US008589842B1

(12) United States Patent
Bhushan et al.

(10) Patent No.: US 8,589,842 B1
(45) Date of Patent: Nov. 19, 2013

(54) DEVICE-BASED RANDOM VARIABILITY MODELING IN TIMING ANALYSIS

(71) Applicant: International Business Machines Corporation, Armonk, NY (US)

(72) Inventors: Manjul Bhushan, Hopewell Junction, NY (US); Eric J. Fluhr, Round Rock, TX (US); Stephen G. Shuma, Underhill, VT (US); Debjit Sinha, Wappingers Falls, NY (US); Chandramouli Visweswariah, Croton on Hudson, NY (US); James D. Warnock, Somers, NY (US); Michael H. Wood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/673,521

(22) Filed: Nov. 9, 2012

(51) Int. Cl.
  *G06F 17/50* (2006.01)
(52) U.S. Cl.
  USPC ........... 716/108; 716/111; 716/113; 716/106; 716/134
(58) Field of Classification Search
  USPC ......................................... 716/108, 132, 134
  See application file for complete search history.

(56) References Cited

U.S. PATENT DOCUMENTS

| 7,882,471 | B1 * | 2/2011 | Kariat et al. ................... 716/113 |
| 8,036,870 | B2 * | 10/2011 | Dierickx et al. ................ 703/13 |
| 8,037,430 | B2 | 10/2011 | Papanikolaou et al. |
| 8,176,454 | B2 | 5/2012 | Potkonjak |
| 2008/0209373 | A1 * | 8/2008 | Buck et al. ........................ 716/6 |
| 2009/0306953 | A1 | 12/2009 | Liu et al. |
| 2010/0211922 | A1 * | 8/2010 | Sinha et al. ........................ 716/6 |
| 2010/0308895 | A1 | 12/2010 | Koushanfar et al. |

OTHER PUBLICATIONS

Chopra, "Statistical Performance Analysis and Optimization of Digital Cirtuits," 2008, 127 pages, a dissertation submitted to University of Michigan for partial fulfillment of Doctor of Philosophy degree.
Drego, "Characterization and Mitigation of Process Variation in Digital Circuits and Systems," 2009, 166 pages, submitted to Massachusetts Institute of Technology for partial fulfillment of Doctor of Philosophy degree.
Hilder et al., "Designing Variability Tolerant Logic using Evolutionary Algorithms," 2009, pp. 184-187, IEEE.
Miranda et al., "Variability Aware Modeling of SoCs: From Device Variations to Manufactured System Yield," 2009, pp. 547-553, IEEE, 10th International Symposium on Quality Electronic Design.
Nardi et al., "Impact of Unrealistic Worst Case Modeling on the Performance of VLSI Circuits in Deep Sub-Micron CMOS Technologies," 1999, pp. 100-106, IEEE Transactions on Semiconductor Manufacturing.

* cited by examiner

*Primary Examiner* — Nha Nguyen
*Assistant Examiner* — Brian Ngo
(74) *Attorney, Agent, or Firm* — Richard M. Kotulak; Hoffman Warnick LLC

(57) ABSTRACT

An approach for performing device-based random variability modeling in timing analysis of a digital integrated circuit having a gate-level design and a device-level custom design is described. In one embodiment, an algorithm is derived from results of simulating the operational behavior of a representative digital integrated circuit. A timing analysis is performed on the device-level custom design part of the digital integrated circuit to obtain device-level random variability sensitivity values. A gate-level characterization is performed on the gate-level design part of the digital integrated circuit to obtain logic gate random variability sensitivity values. A timing analysis is performed on the digital integrated circuit as a function of both the device-level random variability sensitivity values and the logic gate random variability sensitivity values.

20 Claims, 3 Drawing Sheets

DEVICE-BASED RANDOM VARIABILITY MODELING IN TIMING ANALYSIS

BACKGROUND

This invention relates generally to electronic design of digital integrated circuits, and more particularly to device-based random variability modeling in timing analysis of digital integrated circuits, and/or modeling of other timing impact factors that can influence the timing analysis.

As technology dimensions continue to shrink, device variability continues to increase. In addition, the inherent performance advantages of new technology generations are eroding. Traditionally, variability has been accounted for in integrated circuit design by margining during analysis. In order to ensure functionality, the margin values are calculated based on 'worst case' device characteristics and application conditions. With decreasing performance advantage and increasing variability, the use of broad, bounding margins is no longer viable.

There are known techniques for a more refined handling of variability in the industry. Most of these techniques focus on gate-specific variability analysis for gate-level designs. A few methods apply to device-level custom design, but require simulation and/or Monte Carlo analysis, which is impractical for application during timing analysis.

Device-level custom design is typically critical for closure of very high speed, complex functions in advanced technologies. Gate-level design is typically critical for efficient closure of lower speed, less complex functions. Traditionally, device-level custom designs and gate-level designs were contained on separate chips. Denser technologies allow more functions to be combined on a single chip, driving the integration of gate-level and device-level custom designs.

SUMMARY

An elegant approach to variability modeling which can be applied to gate-level and device-level custom design functions consistently during timing analysis is desirable. Variability modeling applied to gate-level and device-level custom design functions consistently during timing analysis enables integration and closure of both types of functions on the same integrated circuit.

In one embodiment, there is a method, implemented on a computer system, for performing device-based random variability modeling in a timing analysis of a digital integrated circuit having a gate-level design and a device-level custom design. In this embodiment, the computer system is used to perform actions comprising: simulating operational behavior of the digital integrated circuit; deriving an algorithm from results of simulating the operational behavior of the digital integrated circuit, the algorithm modeling random delay sensitivity of the digital integrated circuit as a function of at least one user-selected circuit parameter that influences random variability in the digital integrated circuit; performing a timing analysis of the device-level custom design part of the digital integrated circuit, the timing analysis of the device-level custom design including determining a critical device in each stack of devices in the device-level custom design for a given arc transition and applying the algorithm to a predetermined number of device characteristics associated with each of the critical devices to obtain device-level random variability sensitivity values; performing a gate-level characterization of logic gates used in the gate-level design part of the digital integrated circuit, the gate-level characterization of the logic gates including determining a critical device in each stack of devices in the logic gates for a given arc transition and applying the algorithm to a predetermined number of device characteristics associated with each of the critical devices to obtain per-logic gate random variability sensitivity values; and performing a timing analysis of the digital integrated circuit as a function of both the device-level random variability sensitivity values and the logic gate random variability sensitivity values.

In a second embodiment, there is a method, implemented on a computer system, for performing device-based modeling in a timing analysis of a digital integrated circuit having a gate-level design and a device-level custom design. In this embodiment, the computer system is used to perform actions comprising: analyzing operational behavior of the digital integrated circuit; deriving an algorithm from results of analyzing the operational behavior of the digital integrated circuit, the algorithm modeling a timing impact factor that impacts timing of the digital integrated circuit as a function of at least one user-selected circuit parameter that influences the timing impact factor; performing a timing analysis of the device-level custom design part of the digital integrated circuit, the timing analysis of the device-level custom design including determining a critical device in each stack of devices in the device-level custom design for a given arc transition and applying the algorithm to a predetermined number of device characteristics associated with each of the critical devices to obtain device-level timing impact sensitivity values; performing a gate-level characterization of the logic gates used in the gate-level design part of the digital integrated circuit, the gate-level characterization of the logic gates including determining a critical device in each stack of devices in the logic gates for a given arc transition and applying the algorithm to a predetermined number of device characteristics associated with each of the critical devices to obtain per logic gate timing impact sensitivity values; and performing a timing analysis of the digital integrated circuit as a function of both the device-level timing impact sensitivity values and the logic gate timing impact sensitivity values.

In a third embodiment, there is a tangible computer-readable medium storing computer instructions, which when executed by a computer system, enables the computer system to perform device-based random variability modeling in a timing analysis of a digital integrated circuit having a gate-level design and a device-level custom design. In this embodiment, the computer instructions comprise: simulating operational behavior of the digital integrated circuit; deriving an algorithm from results of simulating the operational behavior of the digital integrated circuit, the algorithm modeling random delay sensitivity of the digital integrated circuit as a function of at least one user-selected circuit parameter that influences random variability in the digital integrated circuit; performing a timing analysis of the device-level custom design part of the digital integrated circuit, the timing analysis of the device-level custom design including determining a critical device in each stack of devices in the device-level custom design for a given arc transition and applying the algorithm to a predetermined number of device characteristics associated with each of the critical devices to obtain device-level random variability sensitivity values; performing a gate-level characterization of logic gates used in the gate-level design part of the digital integrated circuit, the gate-level characterization of the logic gates including determining a critical device in each stack of devices in the logic gates for a given arc transition and applying the algorithm to a predetermined number of device characteristics associated with each of the critical devices to obtain per logic gate random variability sensitivity values; and performing a timing analysis of the digital integrated circuit as a function of both the device-level random variability sensitivity values and logic gate random variability sensitivity values.

DETAILED DESCRIPTION

Figure 1:
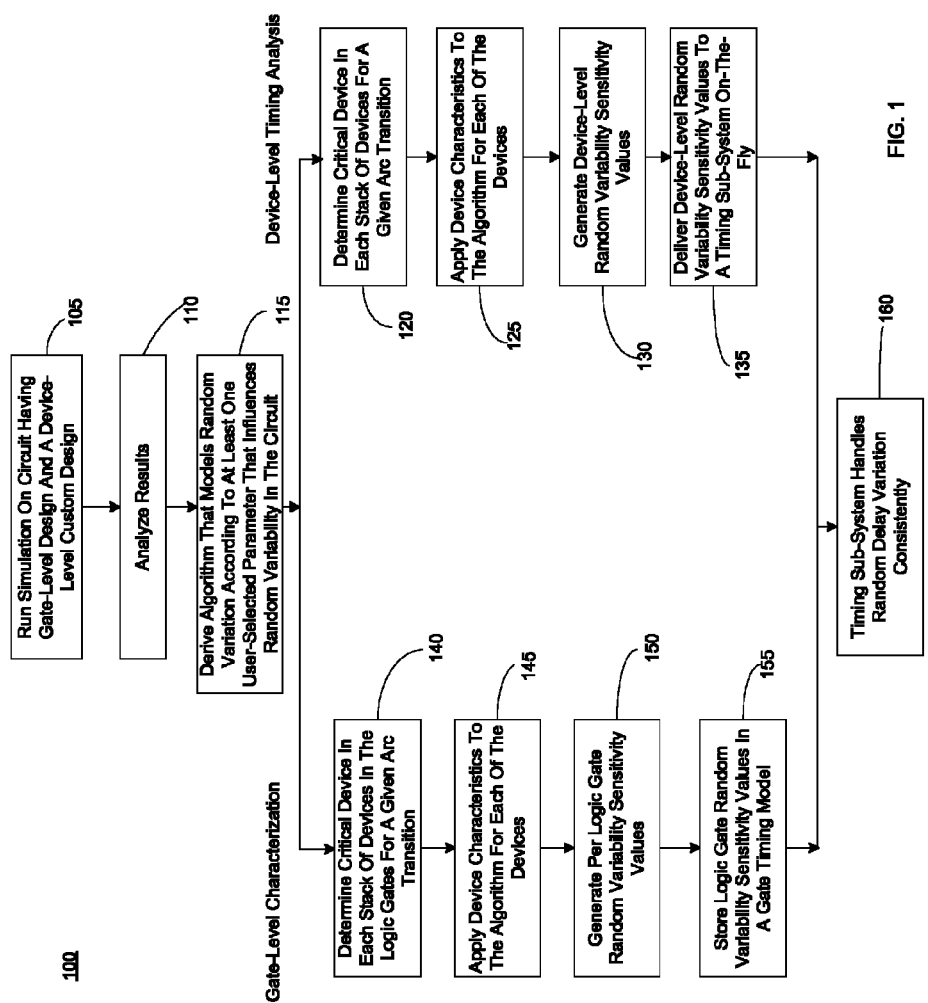
FIG. 1 shows a flow diagram describing device-based random variability modeling in a timing analysis of a digital integrated circuit having a gate-level design and a device-level custom design according to one embodiment of the invention.

Referring to the figures, FIG. 1 shows a flow diagram 100 describing operations associated with device-based random variability modeling in a timing analysis of a digital integrated circuit having a gate-level design and a device-level custom design according to one embodiment of the invention. As an example, a gate-level design can include inverters, buffers, NAND gates, NOR gates, AND gates, OR gates, XOR gates, I/O cores, etc. As used herein, a device-level custom design is generally a logic function that is modeled and optimized at the base transistor level instead of at an abstracted gate function level. A non-exhaustive listing of a device-level custom design can include, any logic function comprised of transistors whose performance is critical enough to warrant modeling at a device level (e.g., high speed processor mathematical functions). In the description that follows, the gate-level design and the device-level custom design are configured for integration on the same integrated circuit chip although those skilled in the art will appreciate that the embodiments are suitable for one chip containing the gate-level design and an adjacent chip containing the device-level custom design.

The operations associated with FIG. 1 begin by obtaining a netlist that describes the connectivity of a user-specified logic function comprised of a group of devices that are representative of a certain technology. In FIG. 1, a simulation is run at 105 on the representative circuitry embodied in the netlist. The representative circuitry can include a gate-level design and a device-level custom design. The simulation simulates the operational behavior of the circuit. For example, the operation behavior that is simulated can include a Monte Carlo response of the circuit across a representative range of process, voltage, and temperature conditions. After performing the simulation, the results are analyzed at 110. The analysis of the results can include calculations of the device random variability for each device type selected for analysis.

Next, an algorithm is derived from the simulation results at 115. The algorithm can be derived by well-known techniques used for simulation analysis of device performance from design manual data and Pelgrom plots. For example, in one embodiment, magnitudes can be derived from a Monte Carlo analysis of a device model response based on empirical observations of the Monte Carlo distributions. In one embodiment, the algorithm can model the random delay sensitivity of the circuit as a function of at least one user-selected circuit parameter that influences random variability in the circuit.

Those skilled in the art will appreciate that the derived algorithm that models random delay sensitivity does not necessarily have to be an algorithm running through a series of processes. Instead, the algorithm can include an equation that generates a value that represents the random variation. The algorithm can also include a look-up table that contains values of random variation sensitivity that can be obtained by a timing analysis tool that is used in the design and analysis of the circuit.

As shown in FIG. 1, upon deriving the algorithm, there are two independent flow paths taken in order to perform the device-based random variability modeling. One path entails performing device-level timing analysis on the circuit. The timing analysis of the device-level design includes determining a critical device in each stack of devices in the device-level custom design for a given arc transition at 120. In one embodiment, a critical device can be the smallest transitioning device in the arc under analysis. The algorithm is applied to a predetermined number of device characteristics associated with the critical devices to obtain a device-level random variability sensitivity value that is accessible on-the-fly by a timing analysis engine. A non-exhaustive list of device characteristics that can be applied to the algorithm include voltage threshold Vt types, device width and/or device length, process conditions (e.g., slow corners, nominal values and fast corners), temperature, voltage and dopants.

In this manner, the algorithm is applied to each of the critical device characteristics at 125, which results in random variability sensitivity values being generated at 130. Generally, the random variability sensitivity values are indicative of the random manufacturing variation for that device. These random variability sensitivity values are delivered to a timing sub-system that can be part of the timing analysis engine package used to perform the device-level timing analysis. In one embodiment, the random variability sensitivity values are delivered on-the-fly to a timing sub-system. In this manner, the timing sub-system can accurately determine random variation values for custom circuitry which cannot be pre-characterized as logic gates can.

The other path associated with the device-based random variability modeling embodiment entails performing gate-level characterization of the logic gates used in the gate-level design. The gate-level characterization of the gate-level design includes determining a critical device in each stack of devices in the logic gates for a given arc transition at 140. Next, the algorithm is applied to a predetermined number of device characteristics associated with each of the critical devices at 145. Applying the algorithm to the critical device characteristics results in logic gate random variability sensitivity values being generated at 150. The logic gate random variability sensitivity values that are generated along this gate-level characterization path can be stored in a gate timing model at 155. In one embodiment, the logic gate random variability sensitivity values can be stored in a data structure that is accessible to the timing sub-system.

At 160, the timing sub-system obtains the gate timing model that incorporates the logic gate random variability sensitivity values and receives the device-level random variability sensitivity values on-the-fly from the device-level timing analysis path as they are generated in order to perform a timing analysis of the circuit that is a function of both the device-level random variability sensitivity values and the logic gate random variability sensitivity values. In this manner, the timing sub-system can handle the random delay variation in the circuit consistently without necessitating any simulation. In particular, all functions within the complete integrated circuit will be analyzed for random variation in the same manner, whether the function was created with custom devices or logic gates. This enables consistent timing closure and subsequent hardware disposition and test.

In one embodiment, the operations described in FIG. 1 can include running a Monte Carlo SPICE simulation on the representative circuitry. For example, inverters, NAND gates and NOR gates in the circuitry can be separately wrapped in a consistent test structure. The Monte Carlo SPICE simulation could then simulate behavioral operation of the circuit using conditions that take into account different voltage threshold Vt types, device widths, process conditions (e.g., slow corners, nominal values and fast corners), varying temperature values, varying voltage conditions and varying dopants, lengths and widths. Simulating the behavioral operation of the circuit under these conditions is only illustrative of one example, and those skilled in the art will appreciate that selected conditions will depend on the circuit and its applied use.

As mentioned above, the determining of the critical devices in each stack of devices during the device-level timing analysis path and the gate characterization path can include detecting a narrowest device in each stack. For example, in the device-level timing analysis path, the FETs (i.e., PFETs and NFETs) in the circuit with the smallest width could be given precedence by the voltage threshold Vt order for both types of FETs. For complex topologies, pre-calculated overrides could be used to emulate the appropriate sensitivity. Non-critical FETs could be ignored. In this manner, at least one user-selected circuit parameter associated with the critical FET could be used to generate the device-level random variability sensitivity values by applying them to the derive algorithm. In one embodiment, the user-selected circuit parameter associated with the critical FET that can be used with the algorithm can include device width and/or length.

Similarly, the determining of the critical devices in each gate for a given arc transition during the gate characterization path can include detecting a narrowest device in each stack. For example, in the gate characterization path, the FETs (i.e., PFETs and NFETs) in the circuit with the smallest width could be given precedence by the voltage threshold Vt order for both types of FETs. For complex topologies, pre-calculated overrides could be used to emulate the appropriate sensitivity. Non-critical FETs could be ignored. In this manner, at least one user-selected circuit parameter associated with the critical FET could be used to generate the device-level random variability sensitivity values from the derive algorithm. In one embodiment, the user-selected circuit parameter associated with the critical FET that can be used with the algorithm can include device width and/or length.

In another embodiment, the approach described above can be used to perform device-based modeling in a timing analysis of a circuit having a gate-level design and a device-level custom design per a timing impact factor. A non-exhaustive listing of timing impact factors that could be used in this device-based modeling approach can include signal propagation times, waveform shapes, guard time calculations and correlated across-chip variation. Those skilled in the art will appreciate that other timing impact factors could be used and that selection of a particular factor will depend on the circuit and its intended application.

Figure 2:
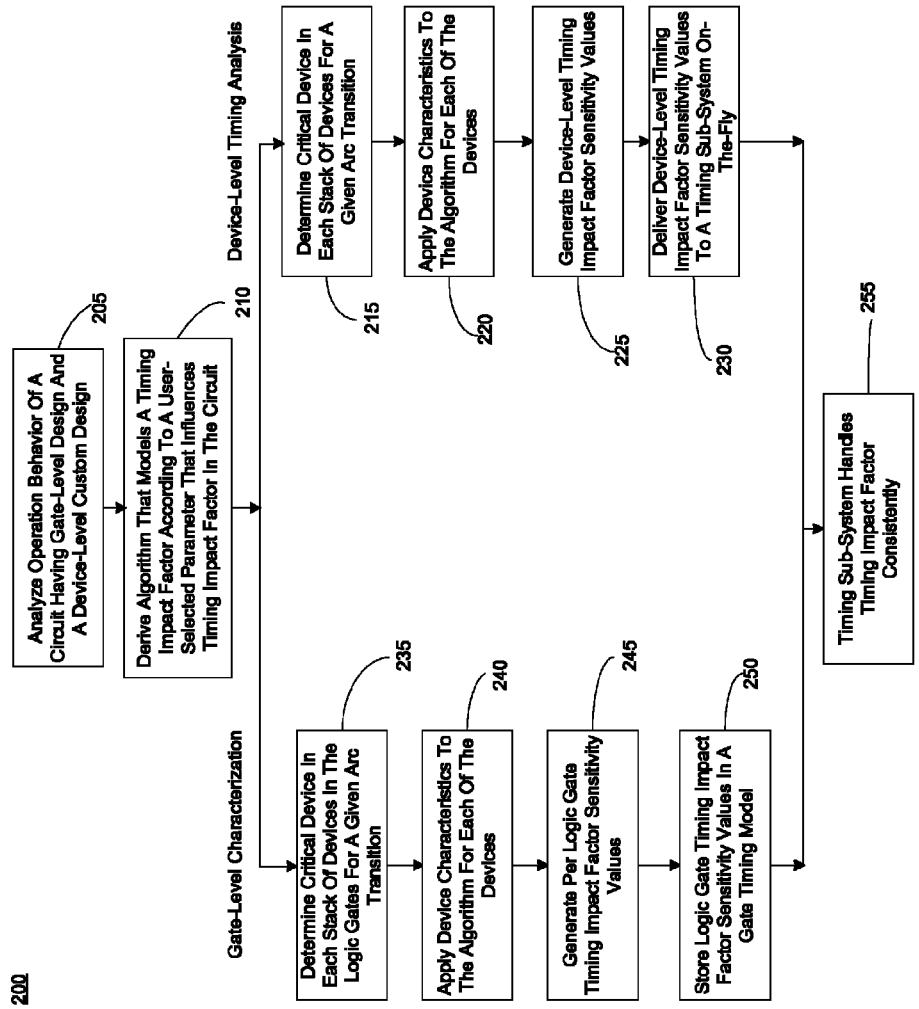
FIG. 2 shows a flow diagram describing device-based modeling in a timing analysis of a digital integrated circuit having a gate-level design and a device-level custom design per a timing impact factor according to one embodiment of the invention.

FIG. 2 shows a flow diagram 200 describing device-based modeling in timing analysis of a digital integrated circuit having a gate-level design and a device-level custom design that is based on a timing impact factor. In FIG. 2, the operational behavior of the representative circuitry is analyzed at 205. Any commercially available stand-alone package that performs analysis of circuit designs can be used to analyze the operational behavior of a circuit. An algorithm is derived from the analysis results at 210 using well-known techniques. In this embodiment, the algorithm would model a particular timing impact factor. The algorithm can be based on any number of parameters selected by user that are known to influence the timing impact factor in the circuit. For example, for correlated across-chip variation, parameters such as distance between devices could be used to derive the algorithm.

In the device-level timing analysis path of FIG. 2, a critical device in each stack of devices in the device-level design for a given arc transition is determined at 215. The algorithm is applied to a predetermined number of device characteristics associated with each of the critical devices at 220 to obtain device-level timing impact sensitivity values at 225. These timing impact sensitivity values are delivered on-the-fly to the timing sub-system at 230.

In the gate-level characterization path, a critical device in each stack of devices in the logic gates for a given arc transition are determined at 235. Next, the algorithm is applied to a predetermined number of device characteristics associated with each of the critical devices at 240. Applying the algorithm to the critical device characteristics results in per logic gate timing impact factor sensitivity values being generated at 245. The logic gate timing impact factor sensitivity values that are generated along this gate-level characterization path can be stored in a gate timing model at 250. In one embodiment, the logic gate timing impact factor sensitivity values can be stored in a data structure that is accessible to the timing sub-system.

At 255, the timing sub-system obtains the gate timing model that incorporates the logic gate timing impact factor sensitivity values and receives the timing impact factor sensitivity values on-the-fly or dynamically from the device-level timing analysis path as they are generated in order to perform a timing analysis of the circuit that is a function of both the device-level timing impact factor sensitivity values and the gate-level timing impact factor sensitivity values. In this manner, the timing sub-system can handle the timing impact factor in the circuit consistently without necessitating any simulation. In particular, the timing subsystem would be able to analyze the timing impact for a factor in question in the same manner whether the function under analysis was created with custom devices or gates.

The foregoing flow chart shows some of the processing functions associated with performing device-based random variability modeling or device-based modeling per a timing impact factor in a timing analysis of a digital integrated circuit. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 3:
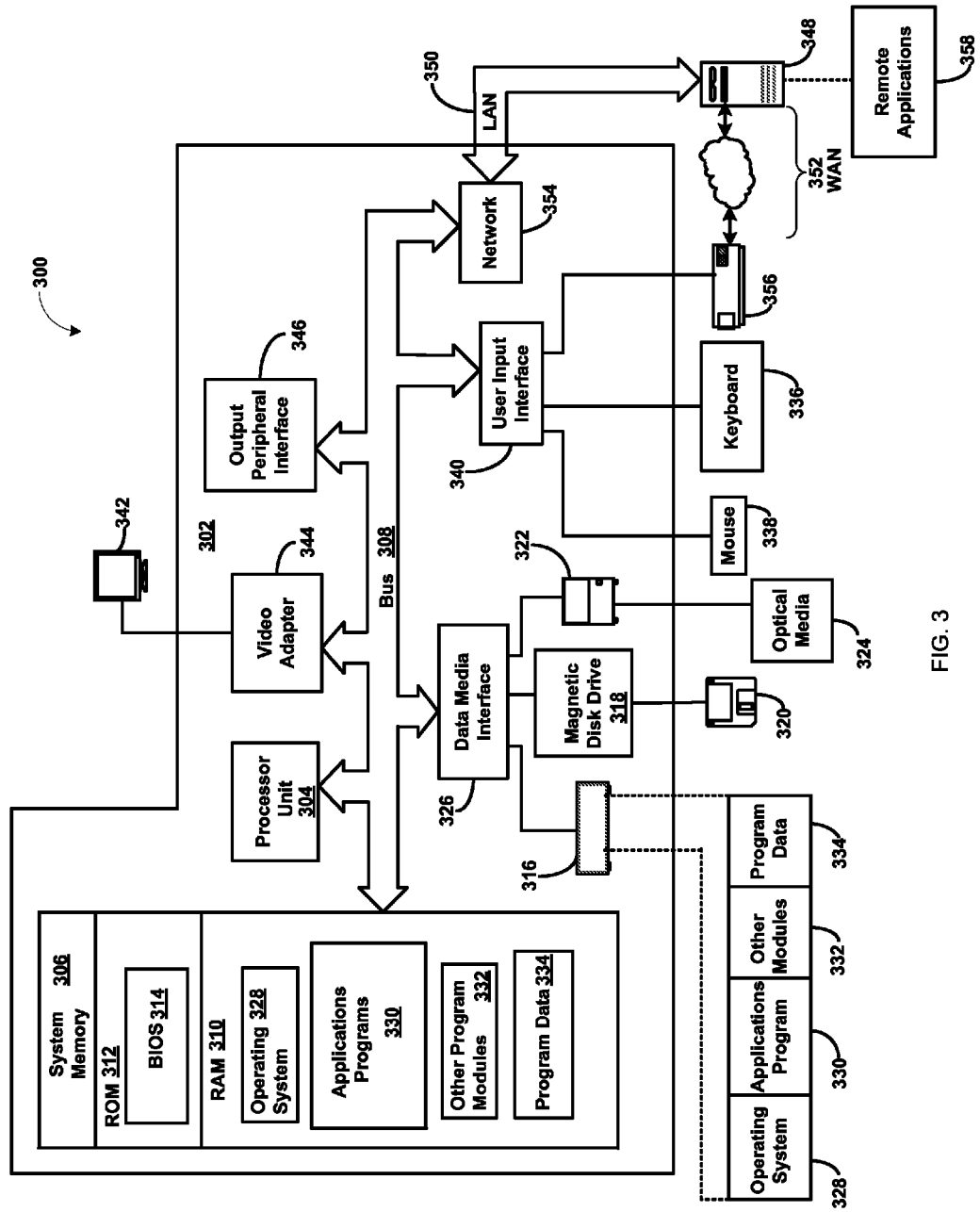
FIG. 3 shows a schematic of an exemplary computing environment in which operations depicted in the flow diagrams depicted in FIGS. 1-2 may be performed.

FIG. 3 shows a schematic of an exemplary computing environment 300 in which operations depicted in the flow diagrams depicted in FIGS. 1-2 may be performed. The exemplary computing environment 300 is only one example of a suitable computing environment and is not intended to suggest any limitation as to the scope of use or functionality of the approach described herein. Neither should the computing environment 300 be interpreted as having any dependency or requirement relating to any one or combination of components illustrated in FIG. 3.

In the computing environment 300 there is a computer 302 which is operational with numerous other general purpose or special purpose computing system environments or configurations. Examples of well-known computing systems, environments, and/or configurations that may be suitable for use with an exemplary computer 302 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 302 may be described in the general context of computer-executable instructions, such as program modules, being executed by a computer. Generally, program modules include routines, programs, objects, components, logic, data structures, and so on, that performs particular tasks or implements particular abstract data types. The exemplary computer 302 may be practiced in distributed computing environments where tasks are performed by remote processing devices that are linked through a communications network. In a distributed computing environment, program modules may be located in both local and remote computer storage media including memory storage devices.

As shown in FIG. 3, the computer 302 in the computing environment 300 is shown in the form of a general-purpose computing device. The components of computer 302 may include, but are not limited to, one or more processors or processing units 304, a system memory 306, and a bus 308 that couples various system components including the system memory 306 to the processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 302 typically includes a variety of computer readable media. Such media may be any available media that is accessible by computer 302, and it includes both volatile and non-volatile media, removable and non-removable media.

In FIG. 3, the system memory 306 includes computer readable media in the form of volatile memory, such as random access memory (RAM) 310, and/or non-volatile memory, such as ROM 312. A BIOS 314 containing the basic routines that help to transfer information between elements within computer 302, such as during start-up, is stored in ROM 312. RAM 310 typically contains data and/or program modules that are immediately accessible to and/or presently operated on by processor 304.

Computer 302 may further include other removable/non-removable, volatile/non-volatile computer storage media. By way of example only, FIG. 3 illustrates a hard disk drive 316 for reading from and writing to a non-removable, non-volatile magnetic media (not shown and typically called a "hard drive"), a magnetic disk drive 318 for reading from and writing to a removable, non-volatile magnetic disk 320 (e.g., a "floppy disk"), and an optical disk drive 322 for reading from or writing to a removable, non-volatile optical disk 324 such as a CD-ROM, DVD-ROM or other optical media. The hard disk drive 316, magnetic disk drive 318, and optical disk drive 322 are each connected to bus 308 by one or more data media interfaces 326.

The drives and their associated computer-readable media provide nonvolatile storage of computer readable instructions, data structures, program modules, and other data for computer 302. Although the exemplary environment described herein employs a hard disk 316, a removable magnetic disk 318 and a removable optical disk 322, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 316, magnetic disk 320, optical disk 322, ROM 312, or RAM 310, including, by way of example, and not limitation, an operating system 328, one or more application programs 330, other program modules 332, and program data 334. Each of the operating system 328, one or more application programs 330 other program modules 332, and program data 334 or some combination thereof, may include an implementation carrying out the operations depicted FIGS. 1-2.

A user may enter commands and information into computer 302 through optional input devices such as a keyboard 336 and a pointing device 338 (such as a "mouse"). Other input devices (not shown) may include a microphone, joystick, game pad, satellite dish, serial port, scanner, camera, or the like. These and other input devices are connected to the processor unit 304 through a user input interface 340 that is coupled to bus 308, but may be connected by other interface and bus structures, such as a parallel port, game port, or a universal serial bus (USB).

An optional monitor 342 or other type of display device is also connected to bus 308 via an interface, such as a video adapter 344. In addition to the monitor, personal computers typically include other peripheral output devices (not shown), such as speakers and printers, which may be connected through output peripheral interface 346.

Computer 302 may operate in a networked environment using logical connections to one or more remote computers, such as a remote server/computer 348. Remote computer 348 may include many or all of the elements and features described herein relative to computer 302.

Logical connections shown in FIG. 3 are a local area network (LAN) 350 and a general wide area network (WAN) 352. Such networking environments are commonplace in offices, enterprise-wide computer networks, intranets, and the Internet. When used in a LAN networking environment, the computer 302 is connected to LAN 350 via network interface or adapter 354. When used in a WAN networking environment, the computer typically includes a modem 356 or other means for establishing communications over the WAN 352. The modem, which may be internal or external, may be connected to the system bus 308 via the user input interface 340 or other appropriate mechanism.

In a networked environment, program modules depicted relative to the personal computer 302, or portions thereof, may be stored in a remote memory storage device. By way of example, and not limitation, FIG. 3 illustrates remote application programs 358 as residing on a memory device of remote computer 348. It will be appreciated that the network connections shown and described are exemplary and other means of establishing a communications link between the computers may be used.

An implementation of an exemplary computer 302 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided by this invention an approach for consistent modeling of random variation or other timing impact factors for a digital integrated circuit. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, implemented on a computer system, for performing device-based random variability modeling in a timing analysis of a digital integrated circuit having a gate-level design and a device-level custom design, the method comprising:

using the computer system to perform actions including:
simulating operational behavior of the digital integrated circuit;
deriving an algorithm from results of simulating the operational behavior of the digital integrated circuit, the algorithm modeling random delay sensitivity of the digital integrated circuit as a function of at least one user-selected circuit parameter that influences random variability in the digital integrated circuit;
performing a timing analysis of the device-level custom design part of the digital integrated circuit, the timing analysis of the device-level custom design including determining a critical device in each stack of devices in the device-level custom design for a given arc transition and applying the algorithm to a predetermined number of device characteristics associated with each of the critical devices to obtain device-level random variability sensitivity values;
performing a gate-level characterization of logic gates used in the gate-level design part of the digital integrated circuit, the gate-level characterization of the logic gates including determining a critical device in each stack of devices in the logic gates for a given arc transition and applying the algorithm to a predetermined number of device characteristics associated with each of the critical devices to obtain per logic gate random variability sensitivity values wherein the device-level custom design and the gate-level design are configured for integration on the same integrated circuit chip; and
performing a timing analysis of the digital integrated circuit as a function of both the device-level random variability sensitivity values and the logic gate random variability sensitivity values.

2. The method according to claim 1, wherein the performing of the timing analysis of the digital integrated circuit includes receiving device-level random variability sensitivity values on-the-fly as generated from the timing analysis of the device-level custom design part of the digital integrated circuit.

3. The method according to claim 1, wherein the performing of the timing analysis of the digital integrated circuit includes handling random delay variation consistently without necessitating another simulation.

4. The method according to claim 1, wherein the algorithm comprises one of: an equation and table.

5. The method according to claim 1, wherein the at least one user-selected circuit parameter used in deriving the algorithm is selected from the group consisting of: voltage threshold types, device types, device lengths, device widths, process conditions, temperatures, voltage conditions and dopants.

6. The method according to claim 1, wherein the determining of the critical devices in each stack of devices during the timing analysis of the device-level custom design part of the digital integrated circuit includes detecting a narrowest device in each stack.

7. The method according to claim 1, wherein the determining of the critical devices in each stack of devices in the logic gates during the gate-level characterization of the gate-level design part of the digital integrated circuit includes detecting a narrowest device in each stack.

8. The method according to claim 1, wherein the performing of the gate-level characterization of the gate-level design part of the digital integrated circuit occurs independently of performing the timing analysis of the digital integrated circuit.

9. The method according to claim 8, further comprising storing logic gate random variability sensitivity values generated from the gate-level characterization of the gate-level design part of the digital integrated circuit in a data structure in a gate timing model accessible by a timing analysis engine.

10. A method, implemented on a computer system, for performing device-based modeling in a timing analysis of a digital integrated circuit having a gate-level design and a device-level custom design, the method comprising:

using the computer system to perform actions including:
analyzing operational behavior of the digital integrated circuit;
deriving an algorithm from results of analyzing the operational behavior of the digital integrated circuit, the algorithm modeling a timing impact factor that impacts timing of the digital integrated circuit as a function of at least one user-selected circuit parameter that influences the timing impact factor;
performing a timing analysis of the device-level custom design part of the digital integrated circuit, the timing analysis of the device-level custom design including determining a critical device in each stack of devices in the device-level custom design for a given arc transition and applying the algorithm to a predetermined number of device characteristics associated with each of the critical devices to obtain device-level timing impact sensitivity values;

performing a gate-level characterization of the logic gates used in the gate-level design part of the digital integrated circuit, the gate-level characterization of the logic gates including determining a critical device in each stack of devices in the logic gates for a given arc transition and applying the algorithm to a predetermined number of device characteristics associated with each of the critical devices to obtain per logic gate timing impact sensitivity values wherein the device-level custom design and the gate-level design are configured for integration on the same integrated circuit chip; and performing a timing analysis of the digital integrated circuit as a function of both the device-level timing impact sensitivity values and the logic gate timing impact sensitivity values.

11. The method according to claim 10, wherein the timing impact factor is selected from the group consisting of: signal propagation times, waveform shapes, guard time calculations and correlated across-chip variation.

12. A non-transitory computer-readable medium storing computer instructions, which when executed by a computer system, enables the computer system to perform device-based random variability modeling in a timing analysis of a digital integrated circuit having a gate-level design and a device-level custom design, the computer instructions comprising:

simulating operational behavior of the digital integrated circuit;

deriving an algorithm from results of simulating the operational behavior of the digital integrated circuit, the algorithm modeling random delay sensitivity of the digital integrated circuit as a function of at least one user-selected circuit parameter that influences random variability in the digital integrated circuit;

performing a timing analysis of the device-level custom design part of the digital integrated circuit, the timing analysis of the device-level custom design including determining a critical device in each stack of devices in the device-level custom design for a given arc transition and applying the algorithm to a predetermined number of device characteristics associated with each of the critical devices to obtain device-level random variability sensitivity values;

performing a gate-level characterization of logic gates used in the gate-level design part of the digital integrated circuit, the gate-level characterization of the logic gates including determining a critical device in each stack of devices in the logic gates for a given arc transition and applying the algorithm to a predetermined number of device characteristics associated with each of the critical devices to obtain per logic gate random variability sensitivity values wherein the device-level custom design and the gate-level design are configured for integration on the same integrated circuit chip; and performing a timing analysis of the digital integrated circuit as a function of both the device-level random variability sensitivity values and the logic gate random variability sensitivity values.

13. The non-transitory computer-readable medium according to claim 12, wherein the performing of the timing analysis of the digital integrated circuit includes receiving the device-level random variability sensitivity values on-the-fly as generated from the timing analysis of the device-level custom design part of the digital integrated circuit.

14. The non-transitory computer-readable medium according to claim 12, wherein the performing of the timing analysis of the digital integrated circuit includes handling random delay variation consistently without necessitating another simulation.

15. The non-transitory computer-readable medium according to claim 12, wherein the algorithm comprises one of: an equation and table.

16. The non-transitory computer-readable medium according to claim 12, wherein the at least one user-selected circuit parameter used in deriving the algorithm is selected from the group consisting of: voltage threshold types, device types, device lengths, device widths, process conditions, temperatures, voltage conditions and dopants.

17. The non-transitory computer-readable medium according to claim 12, wherein the determining of the critical devices in each stack of devices during the timing analysis of the device-level custom design part of the digital integrated circuit includes detecting a narrowest device in each stack.

18. The non-transitory computer-readable medium according to claim 12, wherein the determining of the critical devices in each stack of devices in the logic gates during the gate-level characterization of the gate-level design part of the digital integrated circuit includes detecting a narrowest device in each stack.

19. The non-transitory computer-readable medium according to claim 12, wherein the performing of the gate-level characterization of the gate-level design part of the digital integrated circuit occurs independently of performing the timing analysis of the digital integrated circuit.

20. The non-transitory computer-readable medium according to claim 19, further comprising storing the logic gate random variability sensitivity values generated from the gate-level characterization of the gate-level design part of the digital integrated circuit in a data structure in a gate timing model accessible by a timing analysis engine.

* * * * *